Figure 1:
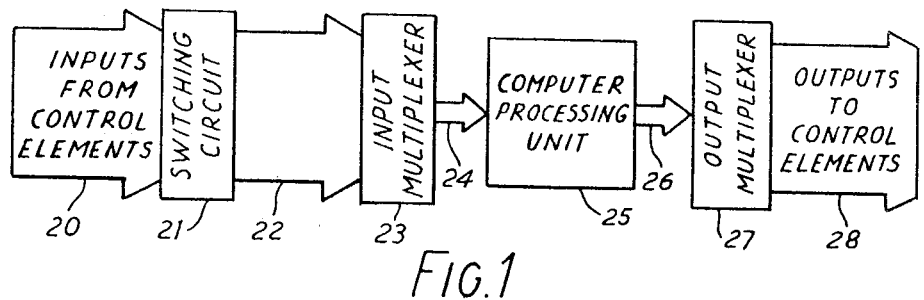

United States Patent [19]

Norton et al.

[11] 4,305,556
[45] Dec. 15, 1981

[54] RAILWAY CONTROL SIGNAL DYNAMIC OUTPUT INTERLOCKING SYSTEMS

[75] Inventors: David J. Norton; Christopher R. Brown, both of Chippenham, England

[73] Assignee: Westinghouse Brake & Signal Co. Ltd., London, England

[21] Appl. No.: 41,594

[22] Filed: May 23, 1979

[30] Foreign Application Priority Data

Jun. 10, 1978 [GB] United Kingdom ............... 26669/78

[51] Int. Cl.³ .............................................. B61L 27/00
[52] U.S. Cl. .................................. 246/5; 246/167 R; 324/73 R
[58] Field of Search ................... 264/900, 200; 246/3, 246/4, 5, 167 R, 131, 34 B; 371/36, 21, 25; 307/211, 132 R, 261, 350; 324/73 R, 415

[56] References Cited

U.S. PATENT DOCUMENTS 3,783,250  1/1974  Fletcher et al. ....................... 371/36

FOREIGN PATENT DOCUMENTS 1489921  10/1977  United Kingdom ................... 246/5

Primary Examiner—J. D. Miller
Assistant Examiner—Reinhard J. Eisenzopf
Attorney, Agent, or Firm—Larson and Taylor

[57] ABSTRACT

A computer based railway interlocking control system, having triple parallel redundant control computers (FIG. 2) provides greater system reliability as compared to a single computer system. The railway traffic control devices, e.g. points and signals, are arranged to be controlled by signals in one of two possible steady states, the interlocking control means (30, 31, 32, FIG. 2) is arranged to produce control signals in the steady state for de-energized or "safe" device settings and in an alternating state for energized or potentially "unsafe" settings. The alternating control signals (33, 34, 35 or 38) must be converted to the corresponding steady state to operate the devices thus, the converting or restoring circuit discriminates against dormant wrong side failures, i.e. "unsafe" signals to increase the inherent safety of the system.

14 Claims, 5 Drawing Figures

RAILWAY CONTROL SIGNAL DYNAMIC OUTPUT INTERLOCKING SYSTEMS

This invention relates to control systems and particularly but not exclusively to computer based railway control signal interlocking systems.

The invention is generally applicable to control systems in which several inputs which may change only after or over a relatively long period, representing sensed system parameters, are evaluated to detect the existence of an at least potentially unsafe condition. The confidence with which such a condition can be detected is dependent upon the reliability of the inputs so that if, for example, an input is constant at a certain value because of a failure but it is not expected to vary anyway that confidence must be low.

Conventional railway control signal interlocking systems are designed to be inherently failsafe and for this purpose the basic system building blocks are themselves designed to be or are used in such a manner as to be inherently fail safe, for example, the interlocking relays are not only designed to be robust but are operated on a fail safe energise to operate basis. The electronic circuits and computer systems employed in interlocking systems presently being proposed or developed are not inherently fail safe in the same sense as conventional railway control systems. One method of providing a degree of inherent safety is described in our granted British Patent Specification 1,489,921.

An object of the present invention is to provide an electronic or computer-based control system which is failsafe.

According to one feature of the invention there is provided an electronic or computer-based railway interlocking control means for use in a railway control system including a plurality of railway traffic control devices each arranged to occupy a first operational state in response to a respective control signal in a first steady state and to occupy a second operational state in response to a control signal in a second steady state, comprising electronic or computer-based apparatus for generating the control signals in either the first steady state or in an alternating state corresponding to the second steady state, and alternating control signal converting means interposed between the interlocking control means and the traffic control devices and responsive to the generated control signals to convert the alternating control signal to a control signal in a second steady state.

According to another feature of the invention, railway interlocking control means of the type referred to are provided wherein a control signal in an alternating state alternates between the first steady state and the second steady state to which the control devices are responsive.

Figure 2:
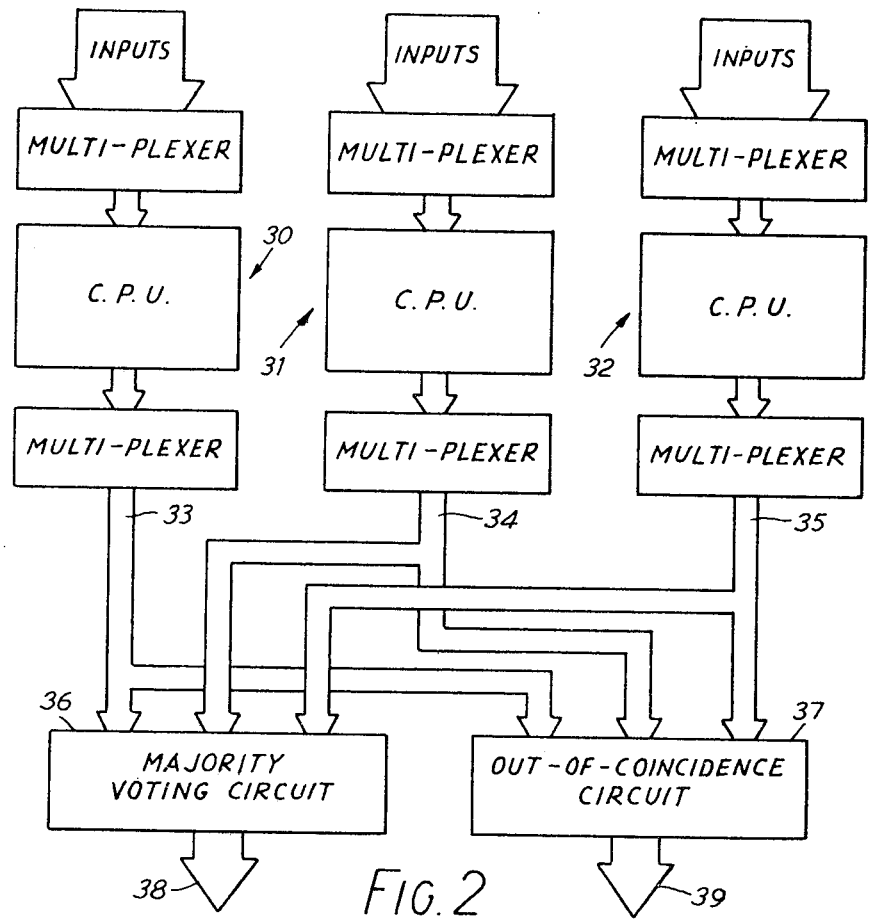
Figure 3:
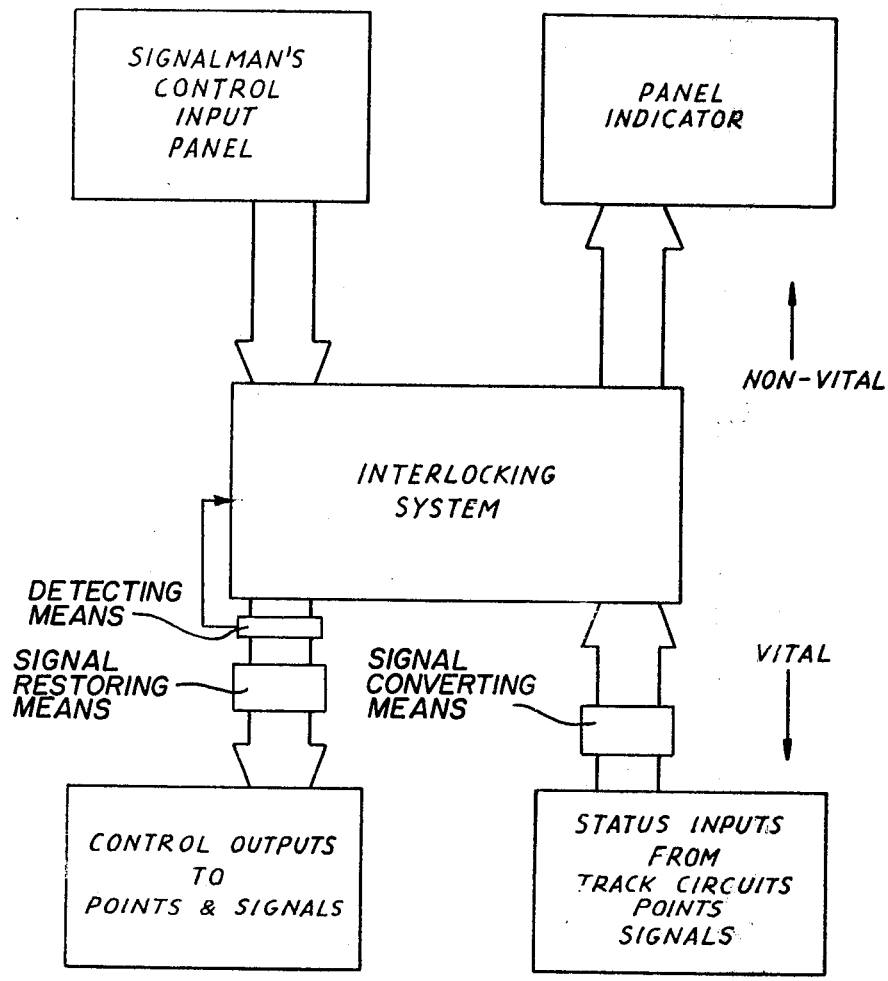

In order that the invention may be fully understood and readily carried in practice, a preferred embodiment will now be described, by way of example only, with reference to the accompanying drawings in which:

FIG. 1 is a block schematic diagram of a computer-based interlocking control set, FIG. 2 is a block schematic diagram of similar control apparatus incorporating triple redundancy, FIG. 3 shows a block diagram of a railway control system with vital and non-vital functions indicated, FIG. 4(a) is a schematic circuit diagram of a comparison circuit for combining redundant output signals, and FIG. 4(b) is a schematic circuit diagram of an out-of-coincidence circuit for checking redundant output signals.

Railway traffic is controlled using three basic control elements namely: track circuits to indicate the position of trains, signals to govern the speed of trains and points to control the path of trains. These three elements are found in systems in which trains are both manually and automatically operated. Whilst failures are inevitable, great emphasis has always been placed on ensuring that, as far as possible, any failed control element fails to a safe state, i.e. a right-side failure, even so, wrong-side failures remain possible occurences. With conventional electronic or electrical railway control systems, failures are usually only detected when an attempt is made to change the state or position of a control element. Thus, if a failure occurs in a control device, its status signalling switches or, in apparatus associated with production of its control signal it may remain undetected for some time until the device is next required to change status. For example, on a track normally used by commuter passenger traffic, a fault occurring during late evening might not be detected until next morning.

Copending U.S. Patent Application Ser. No. 41,628 describes a technique useful for diagnosing dormant wrongside failures. In that technique the control devices' status switches, the input circuits to the interlocking control means, and the communication links therebetween can be checked for dormant wrong-side failure by employing dynamic input switching. In one example of a railway traffic control system in which dynamic input switching is employed, the control elements and their respective status signalling switches are extremely reliable and it is considered of little advantage to extend the checking procedure to include the control elements. However, the data processing equipment at the central control office is of more recently developed form and some means of checking its data handling circuits is advantageous.

The system being referred to is shown in block diagram form in FIG. 1, to which reference will now be made. The inputs from the control elements (not shown) are received on a plurality of parallel cables 20 connected to a bank 21 of switching circuits. The switch bank 21 changes the signals by switching to an alternating waveform. The alternating signals are sent by means of a parallel data highway 22 to input multiplexer unit 23 which converts the input data to serial format comprising 8 bit, 16 bit or 32 bit words, as appropriate to the data processing equipment. The serial data highway 24 connects the input multiplexer 23 to a computer central processing unit 25 which performs interlock and failure checking functions according to its stored programme sub-routines. The processing unit 25 generates control signals again according to its programmed functions which can allow for additional inputs from peripheral equipment such as a manual keyboard (see FIG. 3) when it is desired to set a new train route through the controlled area, for example. The processing units serial output highway 26 is connected to an output multiplexer 27 which, in turn, connects each output control signal to the correct one of the parallel lines 28 communicating with the appropriate control element.

The function of the switching circuit 21 is to force all the input logic signals to a logic '0' state and then to release the inputs allowing them to return to their actual input state i.e. either '0' or '1' according to the status of the relevant track circuit, point or signal. Thus, if an input from a control element is '1' it will be changed to an alternating signal 0101... etc. by the switching circuit 21. However, if the input is '0', it will remain as a continuous '0'.

The switching circuit may operate asynchronously with respect to the data bit rate of the multiplexers 23 and 27 and the computer processing unit 25. It is preferred however to operate a synchronous system since, as it will be readily appreciated by those skilled in the art, the data handling and processing circuits are considerably simplified as compared to an asynchronous system.

The computer programme governing the operation of the processor 25 is designed to check that the input signals are either oscillating 0101... etc., in a steady '0' state or in a steady '1' state. A steady '1' state, as already described, indicates a definite failure to a condition conducive to a dangerous situation arising i.e. a wrong side failure. In this event the programme requires that the relevant part of or the complete system is shut down, or does so automatically.

In order to increase the inherent reliability and safety of the traffic control system the interlocking equipment is triplicated, as shown in FIG. 2. Each of the three sub-systems, indicated generally at 30, 31 and 32, operates independently of its partners but uses the same input signals, and each produces independent output control signals 33, 34 and 35 respectively. These output signals are fed in parallel to a majority voting circuit 36 and also an out-of-coincidence circuit 37 schematic circuit diagrams of which are shown in FIG. 4 at (a) and (b) respectively.

Figure 4:
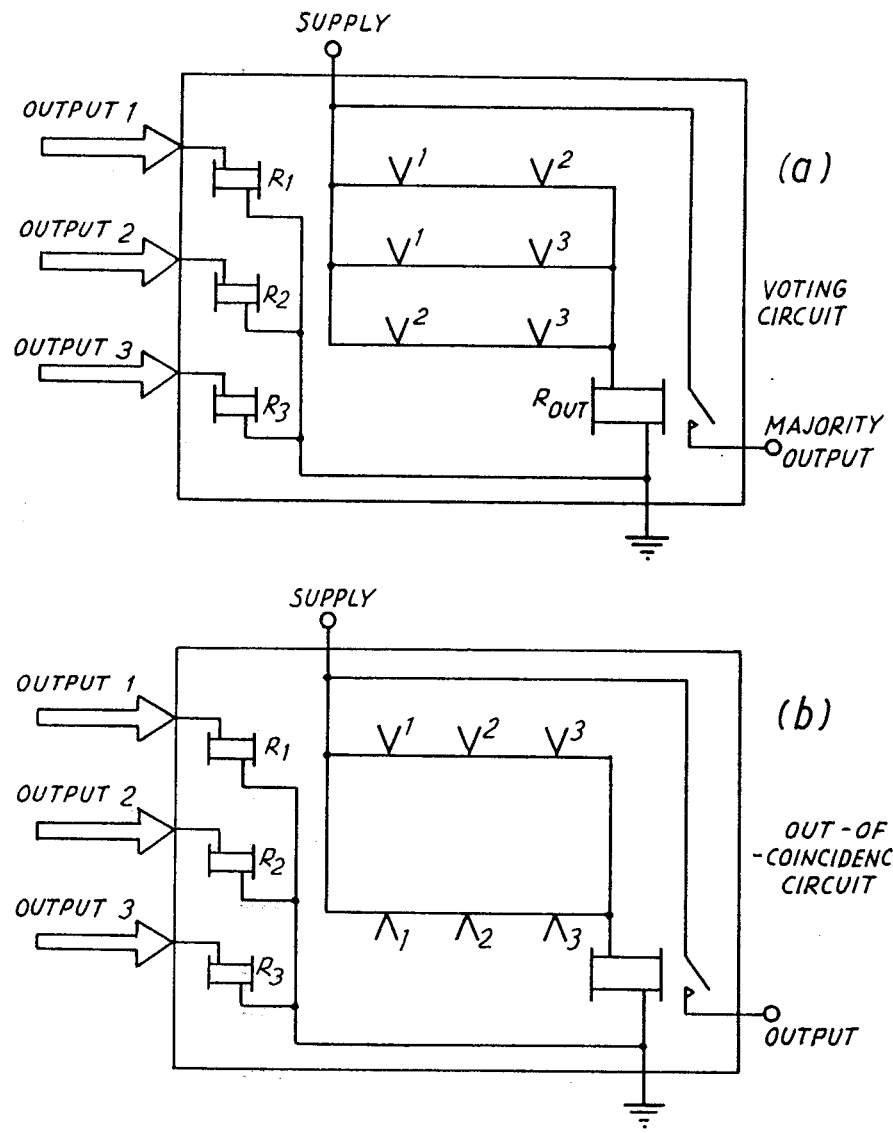

The voting circuit 36 in FIG. 2 and FIG. 4 at (a) is designed according to "fail-safe" principles using relays as shown. Providing any two of the three inputs agree an output is produced, reference 38 in FIG. 2 and this provides one of the control signals 28 in FIG. 1.

The out-of-coincidence circuit 37 in FIG. 2 and FIG. 4 at (b) produces an output 39 only when all three sub-systems are in agreement. If this condition is not met the output 39 activates an alarm circuit to warn of a failure and automatically closes down either the relevant part of or the whole sub-system.

The computer soft-ware defining the actual interlocking functions to be implemented by the central processing unit can contain self-diagnostic routines or separate diagnostic programmes or, the computer can be provided with a complete fault diagnosing sub-system. However, failures can still occur in equipment after the processor itself so that even if a control device is fault-free it could still receive a wrong control signal.

Additionally the system shown does suffer from the disadvantage that it is unable to detect wrong side failures in a dormant mode. For example, if all three sub-systems in FIG. 2 give outputs such that the front contacts of the output relays in the circuit of FIG. 4 at (a) and (b) are made and a failure now occurs in one sub-system such that the associated relay is still energised, then the out-of-coincidence circuit would not discover the fault until the input conditions next change so as to cause the other relays to change.

This disadvantage is overcome by making the output circuits dynamic in the same manner as the inputs, thus making the complete system dynamic. This may be achieved by modifying the programme software to force all '1' outputs '0' and then release in an alternating fashion similar to the input switching method. This produces oscillating signals at the outputs of the sub-systems and these signals have to be proved oscillating by a further fail-safe circuit, such as a diode pump, capable of maintaining a relay in an energised state. The voting and out-of-coincidence circuits are thus as otherwise described.

FIG. 3 shows diagrammatically the usual notional division of interlocking system inputs and outputs into vital and non-vital categories. In modern railway control systems a signalman can establish routes and otherwise control the movement of trains using a control panel which interfaces with the interlocking means. In response to the signalman's selected control inputs interlocking functions are executed to determine the safety and/or availability of the chosen route, the results are shown on an indicator panel together with the current status of all points, signals and track circuits under the signalman's control. This side of the system is conventionally regarded as nonvital because if a failure occurs by human error or equipment fault it is at worst a nuisance and does not degrade the basic operational safety of the railway system.

The other side of the interlocking system which has direct links with the control devices is regarded as vital and the inherent safety of this side is always maintained as high as possible. The dynamic input technique of copending U.S. Application Ser. No. 41,628 is concerned with the vital side of the system which conveys information to the interlocking system. As indicated, status inputs from track circuits, points and signals are connected through a suitable signal converting means so that the inputs are suitable for use by the interlocking system. The present dynamic output invention is concerned with that vital side which conveys control signals from the interlocking system to the railway control devices. As indicated these systems are transmitted via suitable detecting means and signal restoring means.

The invention may be carried into practice in several alternative ways, all of which have the basic essential characteristic features of producing dynamic alternating output control signals, and monitoring of those signals for fault diagnosis. Firstly, the or each interlocking computer processing unit can be arranged, i.e. by appropriate programming, to produce the necessary dynamic signals, a steady '0' signal or an oscillating 0101 ... etc. signal where a steady '1' signal would produce a situation conductive to a wrong-side failure. For example, if a conventional green signal lamp 'on' control output is a steady '1', the corresponding control output according to the invention is an alternating 0101 ...; thus, a steady '1' signal can now be recognised as a wrong-side failure only, whereas a steady '0' remains as green signal lamp 'off' or right-side failure.

Wrong control signals can be detected using further electronic or computer-based apparatus connected to monitor control signals generated by the or each control means. This checking apparatus may be suitably arranged to diagnose erroneous control signals and, for example, shut-down the offending sub-system in a parallel redundant arrangement and to request an appropriate remedy to be carried out. Additionally the final control signals may be monitored to search for erroneous signal as described in co-pending U.S. Patent Application Ser. No. 41,595.

A "black-box" type recorder, well known in the aircraft industry for use in analysing and discovering the causes or crashes or serious incidents may be installed to record control signals for a limited predetermined period, e.g. twelve hours. With such a device, in the event of an accident occurring, all relevant traffic control device control signals, e.g. those for points signals and track circuits, can be analysed for the twelve hours preceding an accident in order to try and discover its cause.

An alternative method of producing the alternating signals is by means of a separate switching circuit, essentially identical to switching circuit 21 employed for the dynamic input checking arrangement referred to above, see FIG. 1. The further switching circuit would preferably be connected directly to the output of computer processing unit 25 in FIG. 1. thus all circuits and connections up to the points where alternating signals are restored will be checked for errors.

According to the present arrangement, when the traffic control devices e.g. points and signals, are "energised", i.e. a green signal lamp is switched on and a points machine is set to connect a side line to a main line, an alternating signal must be generated. The devices themselves only respond to steady state signals, say '0' for de-energised and '1' for energised. By generating an alternating signal instead of an energised steady state '1', then any steady state signal will fail to energise a device since the alternating signal converting or restoring circuit only produces a '1' steady state output on receipt of the alternating signal.

Preferably, the alternating signal switches between the '0' and '1' steady state levels thus considerably simplifying electronic circuits generating or receiving the signals.

In a multiple-redundancy arrangement such as in FIG. 2, each individual system may include a dynamic output checking arrangement as described above, in which case the individually checked control signals may be restored to conventional steady state form before input to the majority voting circuit 36 and out-of-coincidence circuit 37, for example by means of a diode pump of each input line. This arrangement may be preferred where circuits 36 and 37 employs relays, as shown in FIGS. 4(a) and (b), in order to avoid the disadvantages of vibrating contacts, wellknown in the field of relays. However, if circuits 36 and 37 are to be operated in a dynamic mode, i.e. employing solid-state circuits capable of accepting and responding to alternating signals, the dynamic control signals may be transmitted or communicated to the appropriate control device before being restored to the conventional steady form. In this instance, the signal transmission means would be checked by locating the alternating signal restoring circuit at the control device itself, either as a separate circuit or combined with the device. A suitable converting or restoring circuit is a simple diode pump circuit comprising a forward diode in the signal line and a capacitor connected to earth, such a circuit is operative to charge the capacitor to the peak value of an alternating signal whereas a signal at earth voltage is unaffected.

It is envisaged that the present invention could be used in a railway modernisation programme in which conventional relay interlocking apparatus is replaced by a computer-based interlocking control means. The preferred configuration of a system of the invention therefore is to employ a dynamic input arrangement as described in our copending U.S. Patent Application Ser. No. 041,628, and a dynamic output arrangement as described above wherein the control signals are restored to their conventional steady state format before being fed to the control devices.

Having thus described our invention, what we claim is:

1. A railway interlocking control system comprising a plurality of traffic control devices operative to alternative settings by steady state control signals, each of said traffic control devices having a potentially unsafe setting to which the device may be normally operated by a respective steady state control signal and wherein an erroneous control signal in the potentially unsafe state is by definition a wrong side failure, electronic or computer-based control signal interlocking means for, in normal operation, periodically switching control signals in a potentially unsafe first state between that first state and a relatively safer second state to produce an alternating control signal, signal restoring means, located between the interlocking means and the traffic control devices, for restoring alternating control signals to steady first state control signals, and steady first state signal detecting means, interposed between the interlocking means and the signal restoring means and responsive to steady state signals in the first state, for diagnosing potential wrong side failures.

2. Railway interlocking control means according to claim 1, wherein the interlocking control means is adapted to automatically produce an alternating signal.

3. Railway interlocking control means according to claim 1, wherein the interlocking control means is arranged to produce control signals in either first or second steady states and alternating signals are produced by switching means connected to the control means output.

4. A railway control system according to claim 1, comprising a plurality of parallel redundant interlocking control means.

5. A railway control system according to claim 4, wherein corresponding control signals generated by parallel interlocking control means are connected to respective inputs of an out-of-coincidence circuit responsive to non-unanimity of control signals to produce an output indicating an erroneous control signal.

6. A railway control system according to claim 5 wherein each input of the out-of-coincidence circuit is responsive only to steady state signals and is connected to respective control means outputs through alternating control signal converting means.

7. A railway control system according to claim 1 wherein control signals generated by parallel interlocking control means are compared by majority voting means responsive to a majority of equal corresponding signals to discard erroneous minority signals.

8. A railway control system according to claim 7 wherein alternating control signal converting means is connected between the individual output of the or each control means and the respective input to the majority voting means and the voting means is responsive only to steady state control signals.

9. A railway control system according to claim 7 wherein alternating control signal converting means is connected between the output of the majority voting means and the communication means connected to the control devices, and the majority voting means is responsive to alternating state control signals.

10. A railway control system according to claim 7 wherein the alternating control signal converting means is connected between the output of the communication means and the input to the control devices, and the majority voting means is responsive to alternating state control signals.

11. A railway control system as claimed in any one of claims 5, 6, 7, 8 and 9, wherein there are three parallel redundant railway interlocking control means.

12. A railway control system according to claim 11 wherein the interlocking control means is arranged to produce vital and non-vital control signals and only vital control signals have an alternating state.

13. A railway control system according to claim 11 including further electronic or computer-based apparatus connected to monitor control signals generated by the or each control means and arranged to diagnose erroneous control signals.

14. A railway control system according to claim 11 wherein control output signals are recorded by recording means adapted to maintain a recording of the signals for only a predetermined period.

* * * * *